United States Patent
Klotzbach

[11] 3,878,650
[45] Apr. 22, 1975

[54] GLASS GRINDING MACHINE
[76] Inventor: Kurt Klotzbach, A-9210 Poertschach am Woerthersee, Sekull, Austria
[22] Filed: Oct. 2, 1974
[21] Appl. No.: 511,320

[30] Foreign Application Priority Data
Oct. 4, 1973 Germany.............................. 2349871

[52] U.S. Cl........ 51/101 R; 51/215 AR; 51/215 UE
[51] Int. Cl..... B24b 17/02; B24b 47/02; B24b 7/00
[58] Field of Search............... 51/101 R, 101 L, 127, 51/215 AR, 215 HM, 215 UE

[56] References Cited
UNITED STATES PATENTS

| | | | |
|---|---|---|---|
| 3,399,498 | 9/1968 | Lampani et al. | 51/215 AR |
| 3,525,181 | 8/1970 | Carson | 51/101 R |
| 3,525,182 | 8/1970 | Ritter et al. | 51/101 R |

*Primary Examiner*—Othell M. Simpson

[57] ABSTRACT

A glass grinding machine for dressing the edges of glass windowpanes is provided comprising a motor-driven turntable having releasable clamping means automatically coordinated with the movement of the turntable for holding said windowpanes during grinding thereof; a working station provided at the periphery of the turntable and having a rotating grinding wheel movably mounted and controlled by a templet guiding means corresponding to a predetermined contour; a feed station provided at the turntable periphery and having feed means automatically coordinated with the turntable movement for depositing the windowpanes continuously fed for the grinding operation into one of said clamping means; a removal station provided at the turntable periphery and having removal means operating automatically in coordination with the turntable movement for the removal of the ground windowpanes from one of the clamping means, the feed and removal means having a swinging arm driven in coordination with the turntable and provided with means for holding one windowpane each; a swinging arm mounted for rotation about the axis of rotation of the turntable and having on its free end extending beyond the radius of the turntable a rotatably mounted beam having both of its ends positioned at a feed station and at a removal station, respectively, when the beam is oriented radially with regard to the turntable, said beam being equipped with glass pane holding means, a driver connected with the turntable shaft to produce a temporary synchronization of said swinging arm and turntable; a drive for rotating the beam by 180° about its axis of rotation on the swinging arm; and a rotatory drive for rotating the swinging arm independently of the synchronization of the turntable and swinging arm at a velocity exceeding the speed of rotation of the turntable.

14 Claims, 6 Drawing Figures

GLASS GRINDING MACHINE

BACKGROUND

The invention relates to improvements in a glass grinding machine for dressing the edges of glass windowpanes, having a motor-driven turntable provided with releasable clamping means for the temporary clamping of the glass panes, during grinding of the edges, the clamping means functioning automatically in coordination with the turntable movement; a working station at the periphery of the turntable during grinding and a rotating grinding wheel which is movably mounted and controlled by a templet or the like; a feed station at the periphery of the turntable and a feeding means whose operation is automatically coordinated with the turntable movement for placing into one of the clamping means the glass panes which are continually supplied for the grinding operation; and a windowpane removal station at the periphery of the turntable, equipped with windowpane removing means whose operation is automatically coordinated with the turntable movement, for the removal of the finished panes from one of the clamping means, the feeding means and the removing means having a swinging arm whose operation is coordinated with the turntable movement, and holding means for holding the panes of glass.

Glass grinding machines of this kind are known which have a turntable for accommodating two glass panes offset by 180° from one another. In this kind of glass grinding machine, which serves especially for dressing the rounded edges of the side windows of motor vehicles, there is provided on the end of a swinging lever mounted on a column of the machine at the periphery of the turntable a diamond grinding wheel of appropriate profile driven by an electric motor, the swinging lever being urged, by a compressed air jack, for example, with a uniform pressure towards the center of the turntable. The grinding wheel normally has a guiding roller engaging a guiding templet, thus assuring the desired shaping of the windowpanes being ground. Such glass grinding machines have two automatically operated clamping devices for clamping the glass windowpanes, such devices operating such that, during the grinding operation, one glass pane is clamped while the other clamping device, located 180° away, on the opposite side of the turntable, releases the pane whose grinding has been completed, so that it can be removed from the turntable by an operator at the removal station. This operator, in glass grinding machines of this kind, needs only to remove the ground pane from the slowly revolving turntable when the second clamping device automatically releases it, and insert another unground pane into the clamping means in the correct position. This newly inserted pane is then automatically clamped in place, whereupon the process described is repeated.

In the effort to further automate the grinding process, an automatically operating release device has previously been developed which consists of a swinging arm provided with a suction cup and driven by the grinding machine, which, when swung into the machine, grips the finished pane after it has been released by the corresponding clamping means and swings it out of the machine at the release station and then lays it on a table. This relieves the operator's work load, and the saving of time enables him to smooth manually the last, unground edge of the windowpane (only three edges of the pane can be ground by the pattern-guided diamond grinding wheel described above). This known apparatus, which operates automatically, is nevertheless imprecise in its operation in spite of relatively complicated drive systems, since precise control of the movement of the suction cup for gripping the glass relative to the advancing rotating disk is impossible, on account of the turntable movement. Instead, the fact that the swinging arm is driven by the grinding machine but is mounted on an axis of rotation which is not co-axial with the axis of rotation of the turntable, causes, during gripping of the glass by the holding means consisting of a suction cup, a relative movement between the glass and the turntable, so that the emerging glass is not always at the same position. This is unimportant when the glass is picked up manually by the operator and is edged on a separate grinding machine, but it does prevent a fully automatic operation in which the finished windowpane could be laid automatically, for example, on a roller conveyor or the like.

Furthermore, in efforts to develop fully automatic glass grinding machines of the type described, automatic feed systems have been proposed which correspond in principle to the abovedescribed means for removal of the glass. These systems are consequently incapable of assuring precise placement of the glass into the clamping means during the rotation of the turntable, on account of the disposition of the axis of rotation of the swinging arm. Instead, in glass grinding machines which have a feeding and removal system of the kind described in which the axis of the swinging arm is disposed elsewhere than on the axis of rotation of the turntable, it is necessary to stop the grinding machines briefly after every 180° turn in order to permit a precise insertion of the windowpane to be ground. This stopping necessitates a reduction of output of 15 to 20%.

SUMMARY OF THE INVENTION

The invention is addressed to the problem of eliminating the above described deficiencies of known glass grinding machines and of providing a fully automatic glass grinding machine which will assure precise insertion and removal of glass windowpanes without loss of output, while the turntable is rotating.

This problem is solved in accordance with the invention, in a glass grinding machine of the kind initially described, by providing a swinging arm mounted for rotation about the axis of rotation of the turntable, and having on its free end extending beyond the circumference of the turntable a rotatably mounted beam having both its ends equipped with glass pane holding means and located in a radial position with respect to the turntable at the feed station or at the removal station and, as seen in the direction of the turntable axis, above one of the clamping means; by a driver which is actively connected to the turntable shaft to produce a temporary synchronization of the swinging arm and the turntable; by a drive for rotating the beam by 180° about its axis of rotation on the swinging arm; and by a rotatory drive for rotating the swinging arm independently of the synchronization of turntable and swinging arm produced by the driver, at a velocity exceeding the speed of rotation of the turntable.

It is furthermore provided in accordance with the invention that the turntable be disposed with a vertical axis of rotation, the holding means being in accordance with a preferred embodiment of the invention, in the form of suction cups.

In a further embodiment of the invention, a fluid-operated means is provided for the rotation of the aforesaid beam, and provision is also made for the pneumatic operation of the bean revolving means.

A glass grinding machine is also provided wherein a pneumatic, hydraulic or electrical rotary drive acting in two directions for the swinging arm, is actively connected to the latter through a gear meshing with a toothed segment. It is also advantageous to provide a hydraulic shock damper between the driver and the swinging arm to prevent any shock when the driver engages the swinging arm.

It is furthermore advantageous in accordance with the invention that the shock damper be disposed on the swinging arm, preferably that it be articulated thereon, it being possible to provide on the machine column a cam deivce, preferabley consisting of two cams, for the positive deflection of the shock damper for the release of the swinging arm and for swinging it back again in order once again to drive the swinging arm.

In another embodiment of the invention, an additional grinding system with an unguided grinding wheel is associated with the removal station. This is made possible by the fact that the removal system permits an exact, precise laying down of the ground windowpane.

The glass grinding machine of the invention, in which the revolving beam is provided with for example, two suction cups at the outer end of the swinging arm, which according to the essential feature of the invention is rotatable about the axis of rotation of the turntable, and the beam is rotatable pneumatically, for example, by 180°, and is aligned with the swinging arm in the rest positions, wherein the two suction cups are lying on the axis of the swinging arm, operates in the following manner: In the starting position the outer suction cup is located above the newly presented, still unground windowpane, which has been delivered by a conveyormeans—a roller conveyor for example—and has been precisely aligned in a positioning means. The suction cup then grips the windowpane and holds it in the waiting position. When the preceding, edge-dressed windowpane has arrived under the suction cup that is on the inside, on the other end of the beam, the swinging arm, which is rotatable about the turntable axis, is engaged by the revolving turntable through the driver, so that the arm with the two suction cups turns in synchronism with the turntable, even when the velocity of the rotation of the turntable varies for the purpose of achieving a uniform velocity of the translation of the diamond grinding wheel along the edge being ground. After the clamping means has been released, the inside suction cup seizes the finished windowpane. Thereupon, the beam with the two windowpanes suspended from its suction cups is turned 180° as the swinging arm continues to move, and then the new pane of glass is laid on the turntable, automatically clamped in place, and the suction cup is released. The swinging arm is now carrying only the edge-dressed windowpane, and its movement is then accelerated, pneumatically for example, to the removal station, which can be located, for example, at 90° from the feed or pickup station. The swinging arm then stops over the removal station until the pane has been laid down in precisely the correct position. Then the arm is accelerated back to the starting position, grips the next pane which has been delivered in the meantime, and holds it in the waiting position.

Thus, the invention provides a novel means for preventing any relative movement between the windowpane holding devices and the clamping devices while the glass windowpanes are being picked up from or laid down on the turntable or on the feeding and removal means, in particular, through the coaxial arrangement of the axis of rotation of the swinging arm and the axis of rotation of the turntable.

DESCRIPTION OF PREFERRED EMBODIMENTS

Additional features and advantages of the invention will appear from the claims and from the following description of a preferred embodiment, which will be explained in detail with the aid of diagrammatic drawings in which:

Figure 3:
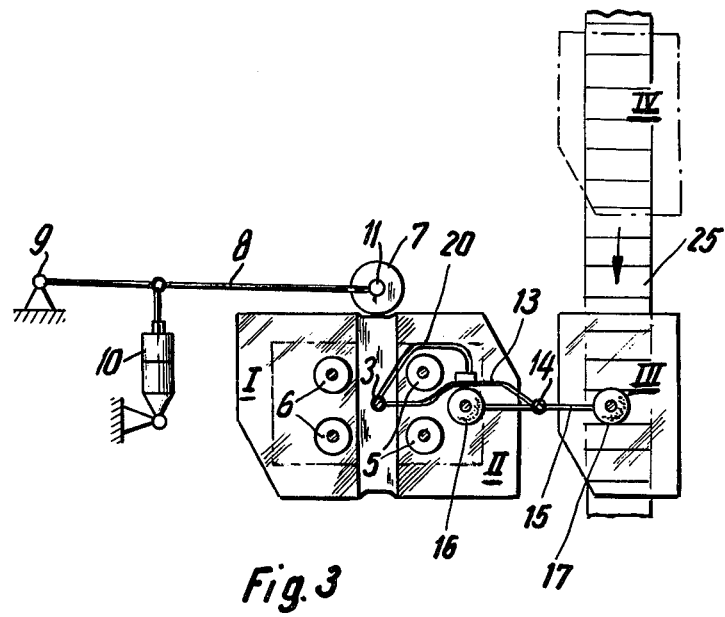
FIG. 3 is a drawing similar to FIG. 2, in which a simplified version of the components of the grinding machine are shown.
Figure 4:
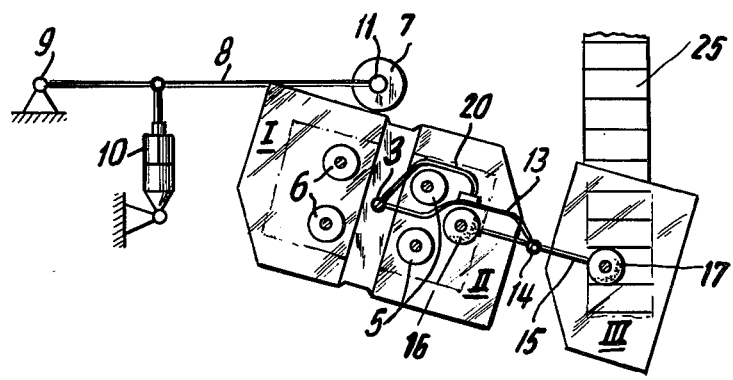
FIG. 4 is a top plan view corresponding to FIG. 3, in which the swinging arm is being driven by the driver on the turntable and the beam is beginning its rotatory movement for the feed and removal of two windowpanes.
Figure 5:
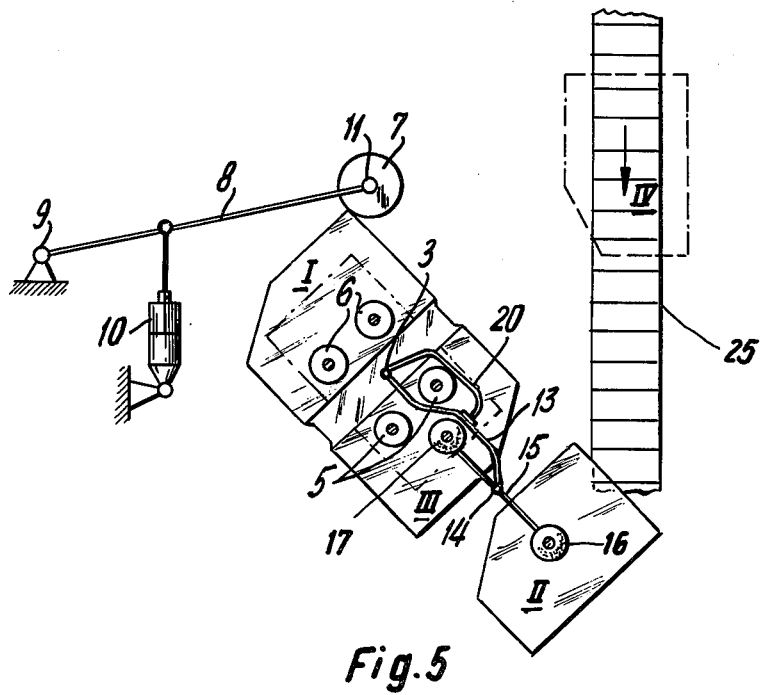
Figure 6:
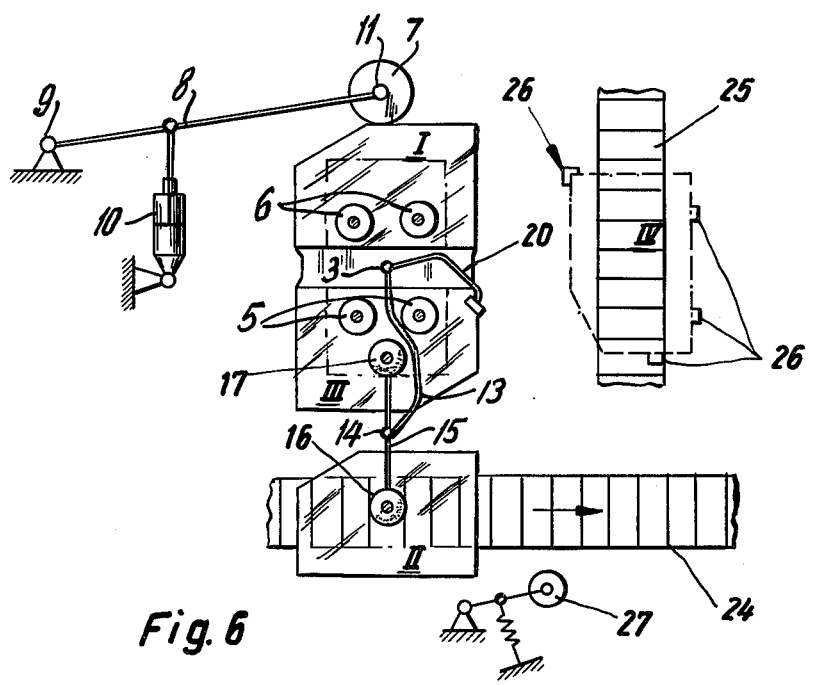

FIG. 5 is a top plan view as in FIG. 4, in which the new, unground glass has been laid down and the accelerated movement of the swinging arm carrying the finished glass to the removal station begins; and FIG. 6 is also a top plan view as in FIGS. 3 to 5 of the grinding machine after completion of the accelerated movement of the swinging arm and after the finished glass has been laid down and the accelerated return of the swinging arm to the starting position begins.

Figure 1:
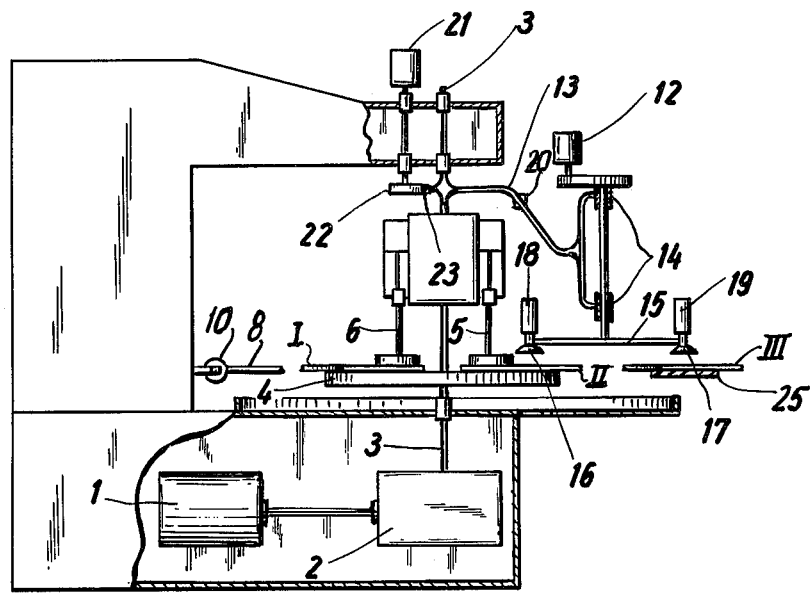
FIG. 1 is a diagrammatic side elevational view of the glass grinding machine of the invention with the new, combined feed and removal system.
Figure 2:
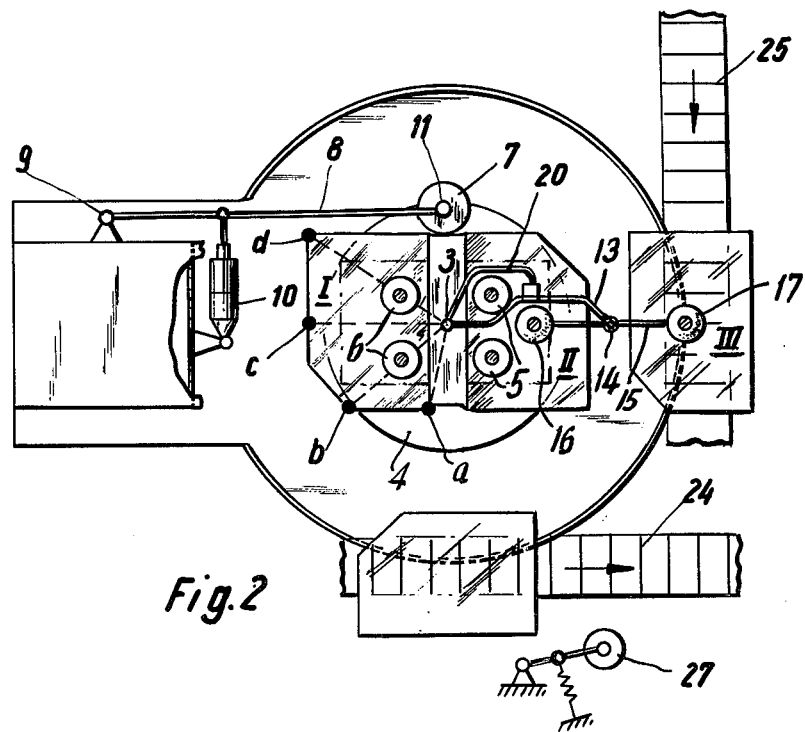
FIG. 2 is a top plan view of the glass grinding machine of FIG. 1, in which the feed and removal systems are in the starting position, one windowpane is in a position to be ground, one has been ground and is ready for removal, and the swinging arm is being driven by the driver.

As seen in FIG. 1, a DC regulating motor 1 drives through a transmission 2 the turntable 4 on vertical axis of rotation 3, and the clamping means 5 and 6 located thereon. The motor speed and the rotatory speed of the turntable are regulated during their rotation by means of a potentiometer control, for example, such that the translatory speed of a diamond grinding wheel 7 (FIGS. 2-6) along the windowpane edges will remain as constant as possible, allowing for the various distances 3-$a$, 3-$b$, 3-$c$ and 3-$d$, (FIG. 2), as the wheel dresses the windowpane edges, the rotatory speed of the wheel also being diminished during the grinding of the sharp corners.

The diamond grinding wheel 7, which is also driven by an electric motor (not shown), is located at the end of a supporting lever 8 which is fulcrumed at 9 and is drawn towards the axis of rotation 3 by a compressed air jack 10, for example. A guide roller whose diameter is the same as that of the grinding wheel 7 is mounted on the grinding wheel shaft 11 and is thus urged against a templet, which is not shown and is replaceable for adaptation to the shape of the windowpane. The guide roller guides the diamond grinding wheel in accordance with the templet while the turntable is revolving, so that the glass is ground to the desired shape. Systems having a plurality of grinding wheels can also be used.

As illustrated in FIG. 1, a swinging arm 13 is rotatably mounted on the turntable axis 3 and supports at its outer end in bearings 14, a beam 15 having suction cups 16 and 17 disposed at its ends, which can be revolved by means of a pneumatic rotating means 12 by 180° on the swinging arm with respect to the latter. The suction cups 16 and 17 are vertically movable by means of compressed air jacks 18 and 19, so that the windowpanes gripped by them can be raised and lowered. A driver 20 fixedly joined to the turntable shaft 3 serves for the momentary synchronous movement of the swinging arm 13 with the turntable. The swinging arm is provided with a shock damper which is movable between two end positions and which can be engaged by the driver 20 in order to prevent vibrations. At the beginning and end of each part of the synchronous operation the shock damper is pivoted, by means of two cams (not shown) fastened to the column of the machine, into the path of the driver and out again, respectively, so that the synchronized operation is established in a positive manner. Instead of the mechanically operating hydraulic shock damper between the driver and swinging arm, a clutch operating electromagnetically, for example, may be provided.

The swinging arm 13 is pivotable by 90° between the positions shown in FIG. 3 and in FIG. 6, if the feed and removal stations are separated by such an angle. The windowpane held in the grinding machine by the clamping means 6, and which is just beginning to be ground, is marked I (FIG. 3), the released pane which is to be removed is marked II, the pane suspended by the suction cup [17] and ready to be fed into the machine is marked III, and the approaching next pane being delivered on a roller conveyor 25 is marked IV. (Also FIG. 3).

The above description refers first to the starting position shown in FIG. 3. In this position the swinging arm 13 with the beam 15 is in the ready position; the pane III, which has been delivered by the roller conveyor 25, is suspended from the suction cup 17. As the turntable continues to turn, and as soon as the swinging arm 13 has reached, through the driver 20 fixedly joined to the axis of rotation 3, the same rotatory speed as the revolving turntable and is in the position shown in FIG. 4, the suction cup 16 grips pane II which has been released by the clamping means 5, whereupon the beam 15 is pivoted 180° into the position as shown in FIG. 5.

The inserted windowpane III is now lowered by the suction cup 17, whereupon it is clamped in place by the clamping means 5 and the suction cup is raised again. An acceleration is imparted by a pneumatic rotatory drive 21 connected to swinging arm 13 by a gear 22 and a toothed segment 23 (FIG. 1) to the swinging arm which bears pane II suspended from suction cup 16; this accelerated movement brings it out of engagement with the driver 20 and advances it ahead of the turntable rotation into the removal position shown in FIG. 6. The suction cup 16 then lays pane II, in the manner already described, on a roller conveyor 24, for example, which forms the removal station. Then the swinging arm is returned by an accelerated movement to the starting position shown in FIG. 3. The shock damper between the swinging arm 13 and the driver 20, or, as an alternative, the driver 20 itself, has already been deflected by a cam affixed to the machine column, so that the swinging arm can return freely. In the starting position, i.e. FIG. 3, the suction cup 16 seizes the new windowpane IV, which in the meantime has been brought in on the roller conveyor 25 and aligned in a positioning means 26 (FIG. 6) and is ready for another operation.

After windowpane II has been removed it is transported by the roller conveyor 24 to a washing machine. Due to the precise positioning made possible by the feed and removal apparatus of the invention, its bottom edge can be dressed and smoothed as it passes by an unguided grinding wheel 27 biased in any desired manner against its edge.

Resort may be had to such modifications and equivalents as fall within the spirit of the invention and the scope of the appended claims.

What is claimed is:

1. A glass grinding machine for dressing the edges of glass windowpanes, comprising a motor-driven turntable having releasable clamping means automatially coordinated with the movement of the turntable for holding said windowpanes during grinding thereof; a working station provided at the periphery of the turntable and having a rotating grinding wheel movably mounted and controlled by a templet guiding means corresponding to a predetermined contour; a feed station provided at the turntable periphery and having feed means automatically coordinated with the turntable movement for depositing the windowpanes continuously fed for the grinding operation into one of said clamping means; a removal station provided at the turntable periphery and having removal means operating automatically in coordination with the turntable movement for the removal of the ground windowpanes from one of the clamping means, the feed and removal means having a swinging arm driven in coordination with the turntable and provided with means for holding one windowpane each; a swinging arm mounted for rotation about the axis of rotation of the turntable and having on its free end extending beyond the radius of the turntable a rotatably mounted beam having both of its ends positioned at a feed station and at a removal station, respectively, when the beam is oriented radially with regard to the turntable, said beam being equipped with glass pane holding means; a driver connected with the turntable shaft to produce a temporary synchronization of said swinging arm and turntable; a drive for rotating the beam by 180° about its axis of rotation on the swinging arm; and a rotatory drive for rotating the swinging arm independently of the synchronization of the turntable and swinging arm at a velocity exceeding the speed of rotation of the turntable.

2. A glass grinding machine according to claim 1, wherein the turntable has a vertical axis of rotation.

3. A glass grinding machine according to claim 1, wherein the holding means for the glass windowpanes are suction cups.

4. A glass grinding machine according to claim 1, wherein a fluid-operated rotating means is provided for said beam.

5. A glass grinding machine according to claim 4, wherein said rotating means for said beam is pneumatically operated.

6. A glass grinding machine according to claim 1, wherein an electrically operated rotating means is provided for said beam.

7. A glass grinding machine according to claim 1, wherein said rotatory drive acts in two directions for said swinging arm and is connected with the latter by means of a pinion meshing with a toothed segment.

8. A glass grinding machine according to claim 1 wherein an hydraulic shock damper is provided between said driver and said swinging arm.

9. A glass grinding machine according to claim 8, wherein said shock damper is disposed on said swinging arm.

10. A glass grinding machine according to claim 8, wherein said shock damper is disposed on said swinging arm and is movable between two end positions.

11. A glass grinding machine according to claim 8, wherein for the positive deflection of said shock damper for the release of said swinging arm and for the renewed driving of same by said driver, a cam system is provided on the machine column.

12. A glass grinding machine according to claim 1, wherein an electromagnetic coupling means is provided for coupling and uncoupling said swinging arm to and from said driver.

13. A glass grinding machine according to claim 1, wherein said feeding station has a positioning means.

14. A glass grinding machine according to claim 1, wherein said removal station has associated with it an additional grinding means having an unguided grinding wheel.

* * * * *